(12) United States Patent
Brinkman et al.

(10) Patent No.: US 8,381,512 B2
(45) Date of Patent: Feb. 26, 2013

(54) PASSIVE AMMONIA-SELECTIVE CATALYTIC REDUCTION FOR NOX CONTROL IN INTERNAL COMBUSTION ENGINES

(75) Inventors: Norman D. Brinkman, Troy, MI (US); Paul M. Najt, Bloomfield Hills, MI (US); Kushal Narayanaswamy, Sterling Heights, MI (US); David B. Brown, Brighton, MI (US); Wei Li, Troy, MI (US); Kevin L. Perry, Fraser, MI (US); Gongshin Qi, Troy, MI (US); Orgun A. Guralp, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 766 days.

(21) Appl. No.: 12/430,819

(22) Filed: Apr. 27, 2009

(65) Prior Publication Data
US 2010/0107605 A1    May 6, 2010

Related U.S. Application Data

(60) Provisional application No. 61/049,804, filed on May 2, 2008.

(51) Int. Cl.
*F01N 3/00* (2006.01)
*F01N 3/10* (2006.01)

(52) U.S. Cl. .................. 60/285; 60/295; 60/301

(58) Field of Classification Search ............ 60/276, 60/285, 286, 295, 299, 301, 303
See application file for complete search history.

(56) References Cited

U.S. PATENT DOCUMENTS

| | | | | |
|---|---|---|---|---|
| 5,782,087 A * | 7/1998 | Kinugasa et al. | ............... | 60/276 |
| 6,047,542 A | 4/2000 | Kinugasa et al. | | |
| 6,109,024 A * | 8/2000 | Kinugasa et al. | ............... | 60/285 |
| 6,361,754 B1 * | 3/2002 | Peter-Hoblyn et al. | ..... | 423/213.2 |
| 7,063,642 B1 | 6/2006 | Hu | | |
| 2002/0129600 A1 * | 9/2002 | Yamamoto et al. | ............ | 60/286 |
| 2005/0129601 A1 | 6/2005 | Li et al. | | |
| 2007/0092426 A1 * | 4/2007 | Driscoll et al. | ............... | 423/352 |
| 2007/0157608 A1 * | 7/2007 | Gandhi et al. | ................. | 60/286 |
| 2008/0026932 A1 | 1/2008 | Satoh | | |
| 2008/0041040 A1 * | 2/2008 | During | ........................... | 60/295 |
| 2008/0053071 A1 | 3/2008 | Adams | | |
| 2008/0089820 A1 | 4/2008 | Jacob | | |
| 2008/0102010 A1 | 5/2008 | Bruck et al. | | |

FOREIGN PATENT DOCUMENTS

DE        102005022420 A1 *   6/2006

OTHER PUBLICATIONS

Keppeler et al., Machine Translation of DE 102005022420 A1; Jun. 14, 2006.*
Keppeler et al., English Abstract of DE 102005022420 A1; Jun. 14, 2006.*
About.com, "Port Fuel Injection", archived Sep. 17, 2005.*
Nakahira, T.,"Catalytic Engine" NOx Reduction of Diesel Engines with New Concept Onboard Ammonia Synthesis System; SAE Technical Paper Series; Feb. 1992; SAE 920469.
Ogunwumi, S.; In-Situ NH3 Generation for SCR NOx Applications; SAE Technical Paper Series; Oct. 2002; SAE 2002-01-2872.

(Continued)

*Primary Examiner* — Kenneth Bomberg
*Assistant Examiner* — Audrey K Bradley

(57) ABSTRACT

Engine exhaust gas feedstream NOx emissions aftertreatment includes a catalytic device connected upstream of an ammonia-selective catalytic reduction device including a base metal. Engine operation can be modulated to generate an engine-out exhaust gas feedstream that converts to ammonia on the catalytic device. The ammonia is stored on the ammonia-selective catalytic reduction device, and used to reduce NOx emissions in the exhaust gas feedstream.

21 Claims, 8 Drawing Sheets

OTHER PUBLICATIONS

Joseph R. Theis "Selective Catalytic Reduction for Treating the NOx Emissions from Lean-Burn Gasoline Engines: Performance Assessment" SAE Technical Paper Series, Detroit, MI, USA.

Joseph R. Theis "Selective Catalytic Reduction for Treating the NOx Emissions from Lean-Burn Gasoline Engines: Durability Assessment" SAE Technical Paper Series, Detroit, MI, USA.

Tadao Nakatsuji "A NOx Reduction system using ammonia-storage selective catalytic reduction in rich/lean excursions" Science Direct, Jul. 27, 2007.

U.S. Appl. No. 61/117,269. Title: Technique for Production of Ammonia on Demand in a Three Way Catalyst for a Passive Selective Catalytic Reduction System. First Inventor: Kevin L. Perry.

U.S. Appl. No. 12/360,901. Title: Technique for Production of Ammonia on Demand in a Three Way Catalyst for a Passive Selective Catalytic Reduction System. First Inventor: Kevin L. Perry.

U.S. Appl. No. 12/360,908, Najt, et al.

U.S. Appl. No. 12/390,588, Narayanaswamy, et al.

U.S. Appl. No. 12/329,162, Perry, et al.

U.S. Appl. No. 12/330,587, Najt, et al.

U.S. Appl. No. 12/624,709, Li, et al.

U.S. Appl. No. 12/576,412, Perry, et al.

U.S. Appl. No. 12/360,901, Perry, et al.

\* cited by examiner

PASSIVE AMMONIA-SELECTIVE CATALYTIC REDUCTION FOR NOX CONTROL IN INTERNAL COMBUSTION ENGINES

CROSS REFERENCE TO RELATED APPLICATIONS

This application claims the benefit of U.S. Provisional Application No. 61/049,804 filed on May 2, 2008 which is hereby incorporated herein by reference.

TECHNICAL FIELD

This disclosure is related to control of aftertreatment of NOx emissions in internal combustion engines.

BACKGROUND

The statements in this section merely provide background information related to the present disclosure and may not constitute prior art.

Manufacturers of internal combustion engines are continually developing new engine control strategies to satisfy customer demands and meet various regulations. One such engine control strategy comprises operating an engine at an air/fuel ratio that is lean of stoichiometry to improve fuel economy and reduce emissions. Such engines include both compression-ignition and lean-burn spark-ignition engines.

Lean engine operation may produce oxides of nitrogen (NOx), a known by-product of combustion, when nitrogen and oxygen molecules present in engine intake air disassociate in the high temperatures of combustion. Rates of NOx production follow known relationships to the combustion process, for example, with higher rates of NOx production being associated with higher combustion temperatures and longer exposure of air molecules to the higher temperatures.

NOx molecules, once produced in the combustion chamber, can be reduced to nitrogen and oxygen molecules in aftertreatment devices. Efficacy of known aftertreatment devices are largely dependent upon operating conditions, such as device operating temperature driven by exhaust gas flow temperatures and engine air/fuel ratio. Additionally, aftertreatment devices include materials prone to damage or degradation in-use due to exposure to high temperatures and contaminants in the exhaust gas feedstream.

Known engine operating strategies to manage combustion to increase fuel efficiency include operating at a lean air/fuel ratio, using localized or stratified charge combustion within the combustion chamber while operating in an unthrottled condition. While temperatures in the combustion chamber can get high enough in pockets of combustion to create significant quantities of NOx, the overall energy output of the combustion chamber, in particular, the heat energy expelled from the engine through the exhaust gas flow can be greatly reduced from normal values. Such conditions can be challenging to exhaust aftertreatment strategies, as the aftertreatment devices frequently require elevated operating temperatures, driven by the exhaust gas flow temperature, to operate adequately to treat NOx emissions.

Aftertreatment systems include catalytic devices to generate chemical reactions to treat exhaust gas constituents. Three-way catalytic devices (TWC) are utilized particularly in gasoline applications to treat exhaust gas constituents. Lean NOx adsorbers (NOx trap) utilize catalysts capable of storing some amount of NOx, and engine control technologies have been developed to combine these NOx adsorbers with fuel efficient engine control strategies to improve fuel efficiency and still achieve acceptable levels of NOx emissions. One known strategy includes using a lean NOx adsorber to store NOx emissions during lean operations and then purge and reduce the stored NOx during rich engine operating conditions with a TWC to nitrogen and water. Particulate filters (DPF) trap soot and particulate matter in diesel applications, and the trapped material is periodically purged during high temperature regeneration events.

One known aftertreatment device comprises a selective catalytic reduction device (SCR). The SCR device includes catalytic material that promotes the reaction of NOx with a reductant, such as ammonia or urea, to produce nitrogen and water. The reductants may be injected into an exhaust gas feedstream upstream of the SCR device, requiring injection systems, tanks and control schemes. The tanks may require periodic refilling and can freeze in cold climates requiring additional heaters and insulation.

Catalytic materials used in SCR devices have included vanadium (V) and tungsten (W) on titanium (Ti) and base metals including iron (Fe) or copper (Cu) with a zeolite washcoat. Catalytic materials including copper may perform effectively at lower temperatures but have been shown to have poor thermal durability at higher temperatures. Catalytic materials including iron may perform well at higher temperatures but with decreasing reductant storage efficiency at lower temperatures.

For mobile applications, SCR devices generally have an operating temperature range of 150° C. to 600° C. The temperature range may vary depending on the catalyst. This operating temperature range can decrease during or after higher load operations. Temperatures greater than 600° C. may cause reductants to breakthrough and degrade the SCR catalysts, while the effectiveness of NOx processing decreases at temperatures lower than 150° C.

SUMMARY

A method and aftertreatment system for reducing NOx emissions in an exhaust gas feedstream output from an internal combustion engine includes a catalytic device connected upstream of an ammonia-selective catalytic reduction device. The ammonia-selective catalytic reduction device includes catalytic material comprising a base metal. The engine operation can be modulated to generate an engine-out exhaust gas feedstream including nitric oxide, carbon monoxide, and hydrogen that converts to ammonia on the three-way catalytic device. The ammonia is stored on the ammonia-selective catalytic reduction device, and used to reduce NOx emissions in the exhaust gas feedstream during engine operation.

BRIEF DESCRIPTION OF THE DRAWINGS

One or more embodiments will now be described, by way of example, with reference to the accompanying drawings in which.

DETAILED DESCRIPTION

Figure 1:
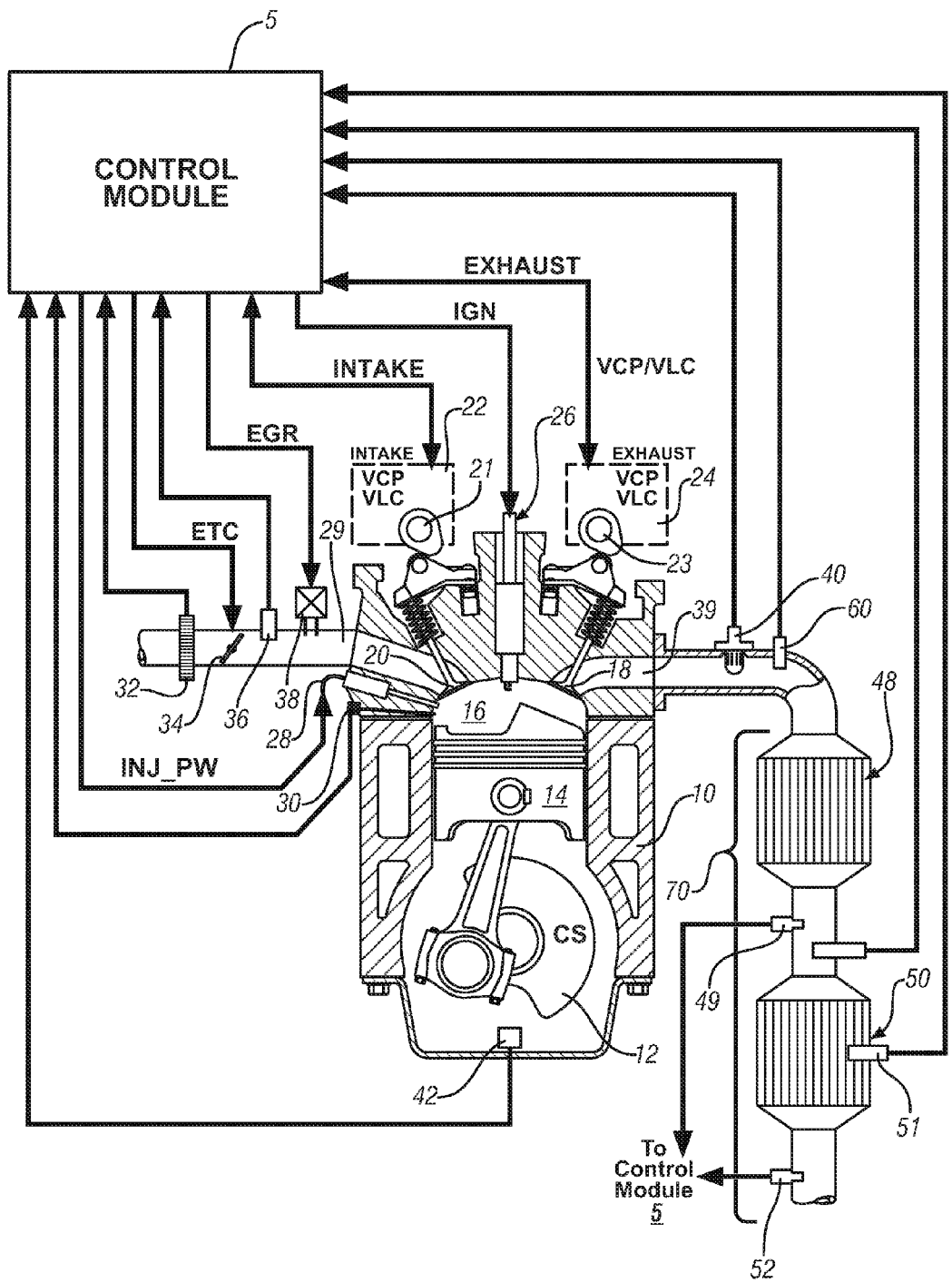
FIG. 1 is a schematic drawing of an exemplary engine system and aftertreatment system in accordance with the present disclosure.

Referring now to the drawings, wherein the depictions are for the purpose of illustrating certain exemplary embodiments only and not for the purpose of limiting the same, FIG. 1 schematically shows an internal combustion engine 10, aftertreatment system 70, and an accompanying control module 5 that have been constructed in accordance with an embodiment of the disclosure. The engine 10 is selectively operative at a rich air/fuel ratio (AFR), a stoichiometric AFR, and at an AFR that is primarily lean of stoichiometry. The disclosure can be applied to various internal combustion engine systems and combustion cycles.

In one embodiment the aftertreatment system 70 can be connected to the engine 10 that is coupled to an electro-mechanical hybrid powertrain system (not shown). The electro-mechanical hybrid powertrain system can include torque machines configured to transfer tractive power to a driveline of a vehicle (not shown).

The exemplary engine 10 comprises a multi-cylinder direct-injection four-stroke internal combustion engine having reciprocating pistons 14 slidably movable in cylinders 15 which define variable volume combustion chambers 16. The pistons 14 are connected to a rotating crankshaft 12 by which linear reciprocating motion is translated to rotational motion. An air intake system provides intake air to an intake manifold 29 which directs and distributes air into intake runners of the combustion chambers 16. The air intake system comprises airflow ductwork and devices for monitoring and controlling the airflow. The air intake devices preferably include a mass airflow sensor 32 for monitoring mass airflow and intake air temperature. A throttle valve 34 preferably comprises an electronically controlled device that is used to control airflow to the engine 10 in response to a control signal (ETC) from the control module 5. A pressure sensor 36 in the intake manifold 29 is configured to monitor manifold absolute pressure and barometric pressure. An external flow passage recirculates exhaust gases from engine exhaust to the intake manifold 29, having a flow control valve referred to as an exhaust gas recirculation (EGR) valve 38. The control module 5 is operative to control mass flow of exhaust gas to the intake manifold 29 by controlling opening of the EGR valve 38.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust openings and closings of the intake and exhaust valves 20 and 18. In one embodiment, the openings and closings of the intake and exhaust valves 20 and 18 can be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism configured to switch and control valve lift of the intake valve(s) 20 and variably adjust and control phasing of the intake camshaft 21 for each cylinder 15 in response to a control signal (INTAKE) from the control module 5. The exhaust VCP/VLC device 24 preferably comprises a controllable mechanism operative to variably switch and control valve lift of the exhaust valve(s) 18 and variably adjust and control phasing of the exhaust camshaft 23 for each cylinder 15 in response to a control signal (EXHAUST) from the control module 5.

The intake and exhaust VCP/VLC devices 22 and 24 each preferably includes a controllable two-step variable lift control (VLC) mechanism configured to control magnitude of valve lift, or opening, of the intake and exhaust valve(s) 20 and 18, respectively, to one of two discrete steps. The two discrete steps preferably include a low-lift valve open position (about 4-6 mm in one embodiment) preferably for load speed, low load operation, and a high-lift valve open position (about 8-13 mm in one embodiment) preferably for high speed and high load operation. The intake and exhaust VCP/VLC devices 22 and 24 each preferably includes a variable cam phasing (VCP) mechanism to control and adjust phasing (i.e., relative timing) of opening and closing of the intake valve(s) 20 and the exhaust valve(s) 18 respectively. Adjusting the phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors (not shown) to determine rotational positions of the intake and the exhaust camshafts 21 and 23. The VCP/VLC devices 22 and 24 are actuated using one of electro-hydraulic, hydraulic, and electric control force, controlled by the control module 5.

The engine 10 includes a fuel injection system, comprising a plurality of high-pressure fuel injectors 28 each configured to directly inject a mass of fuel into one of the combustion chambers 16 in response to a signal from the control module 5. The fuel injectors 28 are supplied pressurized fuel from a fuel distribution system (not shown).

The engine 10 includes a spark-ignition system (not shown) by which spark energy can be provided to a spark plug 26 for igniting or assisting in igniting cylinder charges in each of the combustion chambers 16 in response to a signal (IGN) from the control module 5.

The engine 10 is equipped with various sensing devices for monitoring engine operation, including a crank sensor 42 having output RPM and operative to monitor crankshaft rotational position, i.e., crank angle and speed, in one embodiment a combustion sensor 30 configured to monitor combustion, and an exhaust gas sensor 40 configured to monitor exhaust gases, comprising an air/fuel ratio sensor in one embodiment. The combustion sensor 30 comprises a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. The combustion sensor 30 can also be monitored by the control module 5 to determine a mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors.

The control module 5 executes algorithmic code stored therein to control actuators to control engine operation, including throttle position, spark timing, fuel injection mass and timing, intake and/or exhaust valve timing and phasing, and exhaust gas recirculation valve position to control flow of recirculated exhaust gases. Valve timing and phasing may include negative valve overlap and lift of exhaust valve reopening (in an exhaust re-breathing strategy). The control module 5 is configured to receive input signals from an operator (e.g., a throttle pedal position and a brake pedal position) to determine an operator torque request and input from the sensors indicating the engine speed and intake air temperature, and coolant temperature and other ambient conditions.

The control module 5 is preferably a general-purpose digital computer generally comprising a microprocessor or central processing unit, storage mediums comprising non-volatile memory including read only memory and electrically programmable read only memory, random access memory, a high speed clock, analog to digital and digital to analog circuitry, and input/output circuitry and devices and appropriate signal conditioning and buffer circuitry. The control module 5 has a set of control algorithms, comprising resident program instructions and calibrations stored in the non-volatile memory and executed to provide the desired functions. The algorithms are preferably executed during preset loop cycles. Algorithms are executed by the central processing unit and are operable to monitor inputs from the aforementioned sensing devices and execute control and diagnostic routines to control operation of the actuators, using preset calibrations. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors to determine states of engine operating parameters. The control module 5 is configured to receive input signals from an operator (e.g., via a throttle pedal and a brake pedal, not shown) to determine an operator torque request. The control module 5 monitors the sensors indicating the engine speed and intake air temperature, and coolant temperature and other ambient conditions.

The control module 5 executes algorithmic code stored therein to control the aforementioned actuators to form the cylinder charge, including controlling throttle position, spark-ignition timing, fuel injection mass and timing, EGR valve position to control flow of recirculated exhaust gases, and intake and/or exhaust valve timing and phasing on engines so equipped. Valve timing and phasing can include negative valve overlap (NVO) and lift of exhaust valve reopening (in an exhaust re-breathing strategy) in one embodiment. The control module 5 can operate to turn the engine 10 on and off during ongoing vehicle operation, and can operate to selectively deactivate a portion of the combustion chambers 15 or a portion of the intake and exhaust valves 20 and 18 through control of fuel and spark and valve deactivation. The control module 5 can control AFR based upon feedback from the exhaust gas sensor 40. The exhaust gas sensor 40 can comprise a wide-range air/fuel ratio sensor configured to generate a linear signal corresponding to air/fuel ratio over an air/fuel ratio range. Alternatively, in one embodiment the exhaust gas sensor 40 can comprise a switch-type stoichiometric sensor configured to generate an output signal that corresponds to an air/fuel ratio that is one of rich of stoichiometry and lean of stoichiometry.

The exhaust aftertreatment system 70 is fluidly connected to the exhaust manifold 39 and comprises a catalytic device 48 and an ammonia-selective catalytic reduction (NH3-SCR) device 50. The catalytic device 48 is fluidly and serially connected upstream of the ammonia-selective catalytic reduction device 50. Preferably the catalytic device 48 is located in an engine compartment and is close-coupled to the exhaust manifold 39. Preferably the NH3-SCR device 50 is located in an underfloor location at an extended distance from the catalytic device 48 determined based upon engine and exhaust gas feedstream operating temperatures and other factors. The exhaust aftertreatment system 70 may include other catalytic and/or trap substrates operative to oxidize, adsorb, desorb, reduce, and combust elements of the exhaust gas feedstream as described herein below.

The exhaust aftertreatment system 70 can be equipped with various sensing devices for monitoring the exhaust gas feedstream from the engine 10, including a first NOx sensor 49, a second NOx sensor 52, and an SCR temperature sensor 51 signally connected to the control module 5. The first and second NOx sensors 49 and 52 detect and quantify NOx molecules in the exhaust gas feedstream. The first NOx sensor 49 detects and quantifies NOx molecules in the exhaust gas feedstream exiting the catalytic device 48 and entering the NH3-SCR device 50. An additional NOx sensor 60 may be included in the exhaust aftertreatment system 70 to detect and quantify NOx molecules in the exhaust gas feedstream entering the aftertreatment system 70. In one embodiment only the second NOx sensor 52 is included on the aftertreatment system 70.

During engine operation, the exemplary engine 10 generates an exhaust gas feedstream containing constituent elements that can be transformed in the aftertreatment system, including hydrocarbons (HC), carbon monoxide (CO), oxides of nitrogen (NOx), and particulate matter (PM), among others. Oxygen ($O_2$) is present in the exhaust gas feedstream after operating the engine 10 lean of stoichiometry. Hydrogen ($H_2$) production can occur in the engine 10 through the combustion process. Combustion in a stoichiometric or rich AFR environment, wherein molecular oxygen is scarce, tends to produce elevated levels of molecular hydrogen.

The catalytic device 48 performs a number of catalytic functions for treating an exhaust gas flow. The catalytic device 48 oxidizes hydrocarbons (HC) and carbon monoxide (CO). The catalytic device 48 is formulated to produce ammonia during stoichiometric and rich engine operation. The formulation may involve using varying catalysts including platinum group metals, e.g., platinum, palladium, and rhodium, with cerium and zirconium oxides for oxygen storage capacity. In one embodiment, the catalytic device 48 is a three-way catalytic converter configured to oxidize hydrocarbons (HC) and carbon monoxide (CO) and reduce NOx during stoichiometric engine operations.

The NH3-SCR device 50 reduces NOx into other molecules, including nitrogen and water as described hereinbelow. An exemplary NH3-SCR device 50 includes a substrate (not shown) coated with a zeolite washcoat and catalytic material comprising a catalytically active base metal. The substrate comprises a cordierite or metal monolith with a cell density about 62 to 93 cells per square centimeter (400-600 cells per square inch), and a wall thickness about three to seven mils. The cells of the substrate comprise flow passages through which exhaust gas flows to contact the catalyst to effect storage of ammonia. The substrate is impregnated with the zeolite washcoat. The zeolite washcoat also contains the catalytically active base metals, e.g., iron (Fe), copper (Cu), cobalt (Co), nickel (Ni). Alternatively, vanadium-based and/or tungsten (W) on titanium (Ti) compositions may be used as catalysts. Copper catalysts have been shown to perform effectively at lower temperatures, e.g., 100° C. to 450° C., but have poor thermal durability. Iron catalysts may perform well at higher temperatures, e.g., 200° C. to 650° C., but with decreasing reductant storage capacity.

The NH3-SCR device 50 stores ammonia to reduce NOx emissions. The stored ammonia-selectively reacts with NOx in the presence of the catalytic materials to produce nitrogen and water. The following equations describe the primary reactions with ammonia within the NH3-SCR device 50:

$$4NO+4NH_3+O_2 \rightarrow 4N_2+6H_2O \qquad [1]$$

$$3NO_2+4NH_3 \rightarrow 3.5N_2+6H_2O \qquad [2]$$

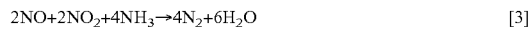
$$2NO+2NO_2+4NH_3 \rightarrow 4N_2+6H_2O \qquad [3]$$

Multiple secondary reactions may concurrently occur and will vary depending on the type of fuel consumed.

A method is disclosed herein to selectively and periodically modulate engine operation to generate an exhaust gas feedstream comprising nitric oxide (NO), carbon monoxide (CO), and hydrogen ($H_2$) to produce ammonia in a catalytic device, such as the catalytic device 48.

Ammonia may be produced in the catalytic device 48 from a conversion process described by the following equation:

$$NO+CO+1.5H_2 \rightarrow NH_3+CO_2 \qquad [4]$$

One having ordinary skill in the art will appreciate that this conversion requires molecular oxygen to be depleted from the catalytic device 48 before NO will react with the molecular hydrogen. In one embodiment, sufficient conversion occurred at temperatures exceeding 250° C. in the catalytic device 48. Excess oxygen is frequently present when the internal combustion engine is operated in lean operating modes, with a lean AFR or with excess air. Thus, the control module 5 controls the AFR to a stoichiometric AFR or rich AFR to deplete oxygen in the exhaust gas feedstream when ammonia production in the catalytic device 48 is desired.

Further, selection of an AFR within the stoichiometric and rich operating ranges further facilitates ammonia production, for example, by producing nitric oxide (NO) and hydrogen ($H_2$) in appropriate ratios. Eq. 4 describes an ideal ratio of 1.5:1 of hydrogen to nitric oxide ($H_2$:NO). However, based upon the environment provided by the NH3-SCR device 50 and other reactions taking place within the catalytic device 48, a different actual ratio of hydrogen ($H_2$) to nitric oxide (NO) can produce ammonia. For example, a ratio of between 3:1 and 5:1 hydrogen to nitric oxide ($H_2$:NO) is preferred in one embodiment.

Modulating engine operation includes operating the engine 10 rich or at stoichiometry while meeting the operator torque request and without changing engine output power. One exemplary method for operating the exemplary engine 10 rich of stoichiometry can include executing multiple fuel injection pulses during a combustion cycle including injecting a first fuel pulse into the combustion chamber 16 during each compression stroke. The mass of fuel injected during the first fuel pulse is determined based upon an amount sufficient to operate the engine 10 to meet the operator torque request and other load demands. Subsequent fuel pulses can be injected into the combustion chamber 16 during other strokes of the combustion cycle thereby generating an exhaust gas feedstream comprising nitric oxide (NO), carbon monoxide (CO), and hydrogen ($H_2$) to produce ammonia in the catalytic device 48. In one embodiment, the subsequent fuel pulses are executed late in a power stroke or early in an exhaust stroke of the combustion cycle thereby minimizing likelihood of combustion in the combustion chamber 16.

Selection of a catalytically active material that enables lower ratios of hydrogen ($H_2$) molecules to nitric oxide (NO) molecules on the catalytic device 48 is preferable, as hydrogen requirements directly relate to an amount of fuel that is consumed by the subsequent fuel pulses to enable ammonia production. Calibration according to test results or modeling according to methods sufficient to accurately estimate engine operation, aftertreatment processes, and conversions can be utilized to select a preferred AFR to control ammonia production. One having ordinary skill in the art will appreciate that carbon monoxide (CO) presence must also be considered to facilitate the reaction described above.

Ammonia production can be controlled or enabled according to a number of factors affecting ammonia usage within the NH3-SCR device 50, including estimated ammonia storage, estimated or detected ammonia breakthrough, estimated or detected NOx breakthrough downstream from the NH3-SCR device 50, and engine operation conducive to ammonia production. Monitoring of these factors can be accomplished through monitoring a number of inputs, including engine operation, exhaust gas properties, and NOx conversion efficiency within the NH3-SCR device 50. For example, the engine 10 produces higher levels of NOx and hydrogen during engine acceleration. Such periods conducive to ammonia production can be utilized to minimize intrusive operation of ammonia production under engine operating conditions less conducive thereto. Periods of modulating engine operation to produce ammonia will vary depending upon required ammonia production, the particulars of the system employed, and the particular operation of the engine 10.

Figure 2:
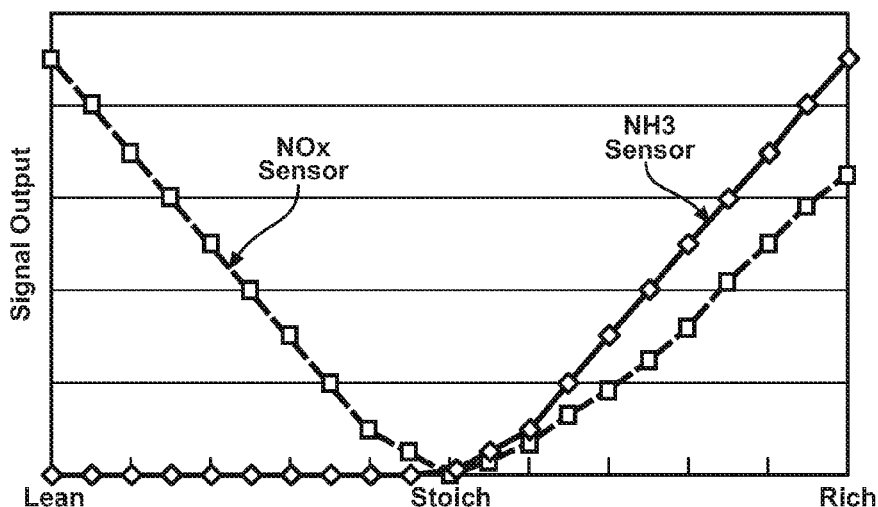
FIG. 2 graphically illustrates exemplary test data from a NOx sensor and an ammonia sensor as a function of AFR in accordance with the present disclosure.

FIG. 2 graphically illustrates exemplary test data showing signal outputs from a known NOx sensor and a known ammonia sensor as a function of AFR from the engine 10, illustrative of signal outputs from the first and second NOx sensors 49 and 52 and an ammonia sensor (not shown). Known NOx sensing technologies do not distinguish between NOx molecules and ammonia molecules in the exhaust gas feedstream. During lean engine operating conditions, when ammonia presence in the exhaust gas feedstream is minimal and NOx molecules are present, signal output from the NOx sensor indicates NOx molecules and increases with increasing AFR. Signal output from the ammonia sensor is minimal. At stoichiometric engine operating conditions, when NOx molecules and ammonia molecules present in the exhaust gas feedstream are minimal, signal output from the NOx sensor and the ammonia sensor are minimal. As the AFR decreases during rich engine operating conditions, the presence of ammonia molecules increase while NOx molecules are minimal in the exhaust gas feedstream. Signal output from the NOx sensor and the ammonia sensor increase during rich engine operation as the AFR decreases. Therefore, during rich engine operation increased signal output from the first and second NOx sensors 49 and 52 can be used to indicate ammonia molecules in the exhaust gas feedstream. Thus, ammonia breakthrough may be detected by monitoring signal output of the second NOx sensor 52 during rich engine operation. In one embodiment, the second NOx sensor 52 is monitored for increased signal output during ammonia production. When signal output from the second NOx sensor 52 increases, the control scheme 200 determines that ammonia breakthrough is occurring.

Figure 3:
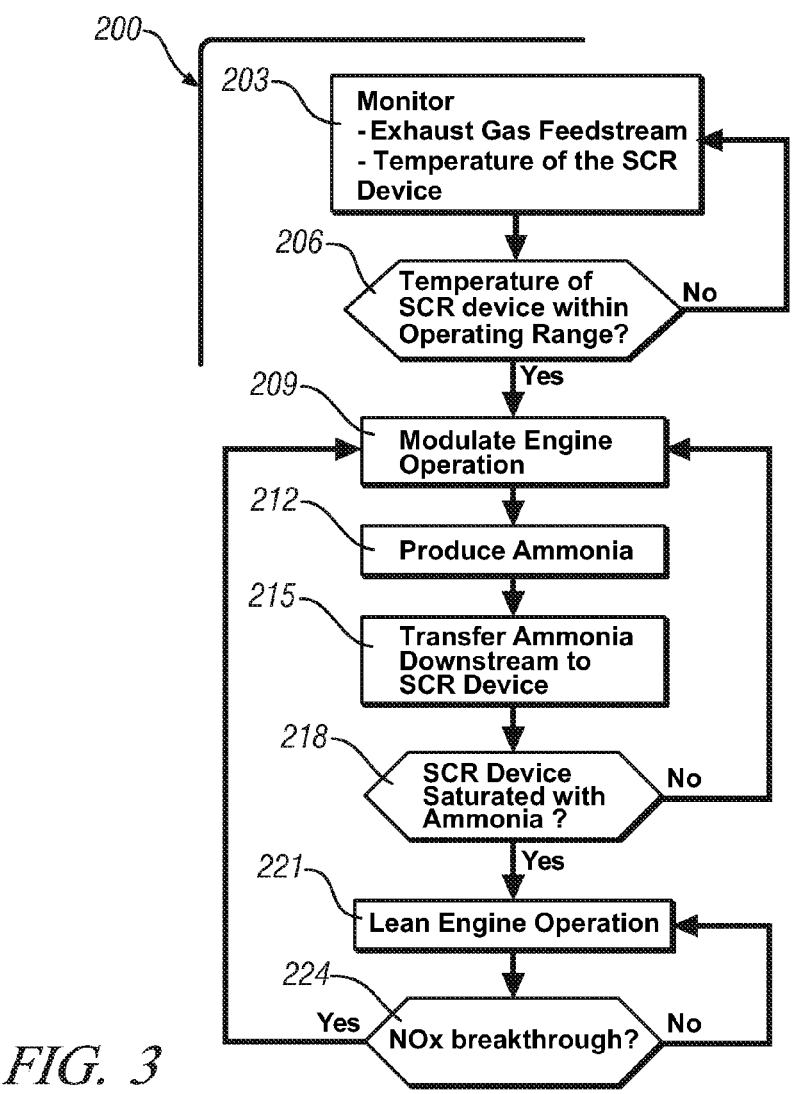
FIG. 3 is a control scheme for managing an exhaust gas feedstream from the engine in accordance with the present disclosure.

FIG. 3 shows a control scheme 200 for managing an exhaust gas feedstream from the engine 10 during engine operation. The control scheme 200 is depicted as a plurality of discrete elements. Such illustration is for ease of description and it should be recognized that the functions performed by these elements may be combined in one or more devices, e.g., implemented in software, hardware, and/or application-specific integrated circuitry. For example, the control scheme 200 may be executed as one or more algorithms in the control module 5. The control scheme 200 includes monitoring the exhaust gas feedstream and the aftertreatment system (203), including detecting NOx breakthrough and ammonia breakthrough downstream of the NH3-SCR device 50 using the second NOx sensor 52. Monitoring the aftertreatment system comprises monitoring temperature of the NH3-SCR device 50 using the SCR temperature sensor 51.

Before initiating lean engine operation or modulating engine operation to produce ammonia, the temperature of the NH3-SCR device 50 must be within a predetermined temperature range (206). In one embodiment of the NH3-SCR device 50, the predetermined temperature range is 150° C. to 450° C. Preferably, the temperature of the NH3-SCR device 50 is monitored continuously using the SCR temperature sensor 51. When the temperature of the NH3-SCR device 50 is outside the predetermined temperature range, engine operation may be controlled to a stoichiometric AFR.

When the temperature of the NH3-SCR device 50 is within the predetermined temperature range, the control scheme 200 modulates engine operation to produce nitric oxide (NO), carbon monoxide (CO), and hydrogen ($H_2$) for ammonia production (209). Ammonia is produced in the catalytic device 48 as described hereinabove using the nitric oxide (NO), carbon monoxide (CO), and hydrogen ($H_2$) (212) and transferred downstream to the NH3-SCR device 50 for storage (215).

The control scheme 200 can adjust engine operation to discontinue ammonia production subsequent to determining the NH3-SCR device 50 is saturated with ammonia (218). Ammonia production can also be discontinued after a predetermined threshold of ammonia molecules are generated or when engine operating conditions are not conducive to ammonia production, e.g., during vehicle decelerations, engine idling, or engine stops. Ammonia saturation may be estimated based upon a predetermined elapsed time, or by monitoring the exhaust gas feedstream downstream of the NH3-SCR device 50 to detect ammonia breakthrough, or determined after executing a predetermined number of cylinder events. Ammonia breakthrough may be detected by monitoring signal output of an ammonia sensor (not shown) configured to monitor the exhaust gas feedstream downstream of the NH3-SCR device 50. Another method for detecting ammonia breakthrough comprises monitoring the second NOx sensor 52. During rich engine operation, signal output from the second NOx sensor 52 increases, indicate ammonia breakthrough. In one embodiment, saturation may be estimated using a model according to methods sufficient to accurately estimate operation of the combustion cycle, aftertreatment processes, conversions, and monitored operating conditions including intake mass airflow, AFR, engine speed, TWC temperature, TWC aging state, SCR device temperature, and SCR device aging state. The model may be calibrated according to test results corresponding to a particular hardware application.

After determining the NH3-SCR device 50 is saturated with ammonia, the control scheme 200 discontinues modulating engine operation and ammonia production and transitions engine operation to lean engine operation (221), resulting in increased NOx emissions into the exhaust gas flow. The catalytic device 48 reduces a portion of the NOx emissions transferring oxygen and nitrogen downstream to the NH3-SCR device 50. Ammonia stored on the catalyst of the NH3-SCR device 50 reacts with NOx entering the NH3-SCR device 50 thereby reducing NOx emissions and producing nitrogen and water. The stored ammonia is depleted as ammonia molecules react with NOx molecules. When the ammonia on the catalyst of the NH3-SCR device 50 is depleted, NOx emissions pass through the NH3-SCR device 50 unprocessed.

Therefore, the control scheme 200 preferably discontinues lean engine operation after detecting NOx breakthrough downstream from the NH3-SCR device 50 (224). An increase in signal output from the second NOx sensor 52 is correlatable to an increase in NOx emissions out of the NH3-SCR device 50 during lean engine operation, and indicates NOx breakthrough. Another method for detecting NOx breakthrough comprises modeling ammonia depletion. Ammonia depletion and therefore NOx breakthrough may be estimated using a model according to methods sufficient to accurately estimate operation of the combustion cycle, aftertreatment processes, conversions, and monitored operating conditions including intake mass airflow, AFR, engine speed, TWC temperature, TWC aging state, SCR device temperature, and SCR device aging state. The model may be calibrated according to test results corresponding to a particular hardware application. After determining that ammonia is depleted or detecting NOx breakthrough, the control scheme 200 may modulate engine operation to produce ammonia (209).

Figure 4:
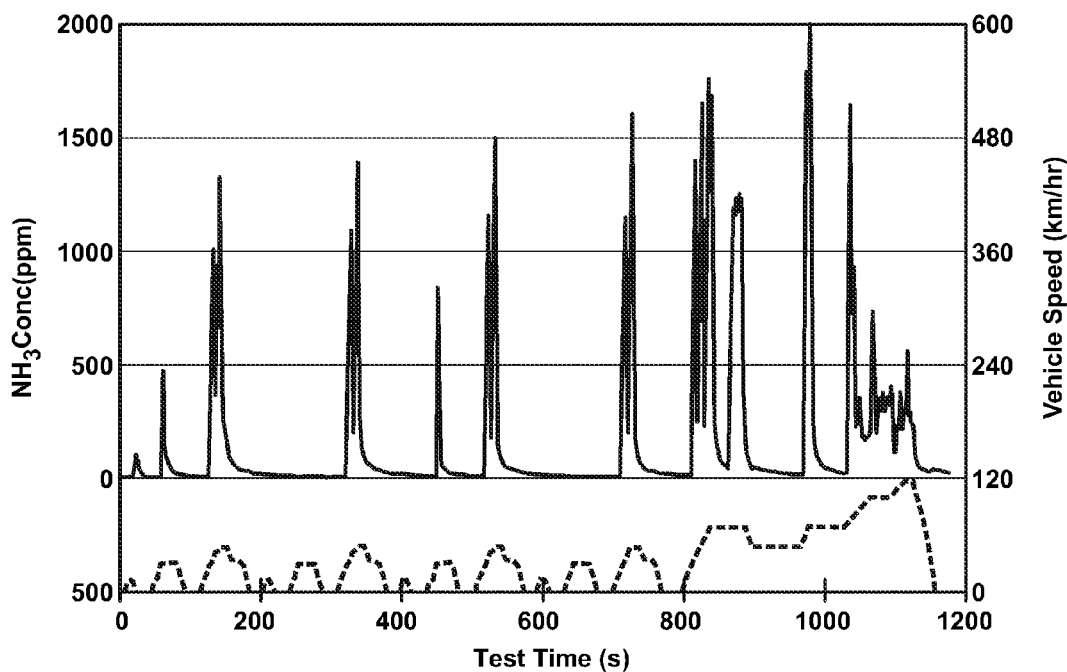
FIG. 4 graphically depicts exemplary test data describing a relationship between ammonia production and vehicle speed in accordance with the present disclosure.

FIG. 4 graphically depicts exemplary test data describing a relationship between ammonia production and vehicle speeds. Ammonia concentrations were measured with a Fourier-transform infrared spectrometer during engine operations using the exemplary aftertreatment system 70. As FIG. 4 shows, during engine accelerations, when the exemplary engine 10 operates at stoichiometry or slightly rich of stoichiometry (e.g., AFR between 13.8:1 and 14.2:1), ammonia concentrations produced by the catalytic device 48 can increase.

Figure 5:
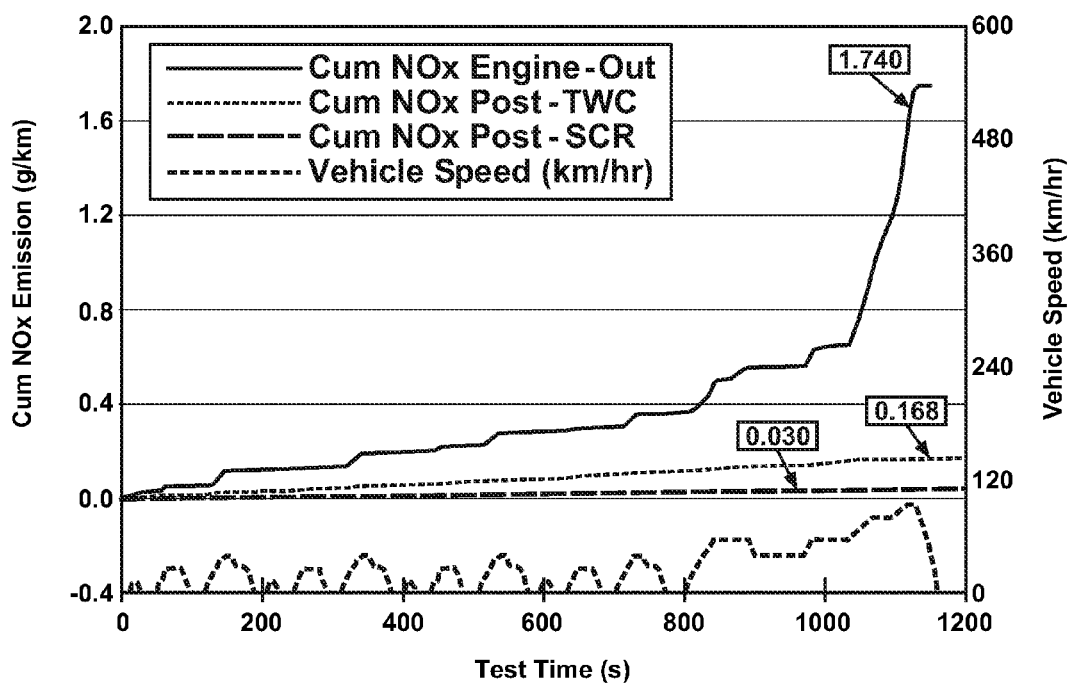
FIG. 5 graphically depicts exemplary test data describing a relationship between cumulative NOx emissions and vehicle speed in accordance with the present disclosure.

FIG. 5 graphically depicts exemplary test data depicting a relationship between cumulative NOx emissions out of the exemplary engine 10, catalytic device 48, and the NH3-SCR device 50 and vehicle speed. When the exemplary engine 10 is controlled to alternate between lean and rich excursions, significantly less NOx emissions pass out of the aftertreatment system 70 than emitted by the exemplary engine 10 into the exhaust gas feedstream. FIG. 5 also depicts a NOx reduction by the NH3-SCR device 50 after NOx reduction in the catalytic device 48.

Figure 6:
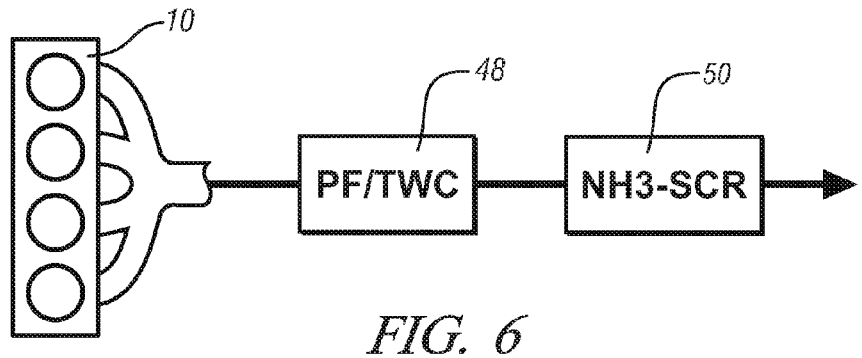
FIGS. 6-10 schematically illustrate additional exemplary configurations of the exhaust aftertreatment system in accordance with the present disclosure.

The abovementioned methods may be employed in engine systems using different exhaust aftertreatment configurations, with like numerals indicating like elements. FIG. 6 shows an engine 10 and an exhaust aftertreatment system including a particulate filter combined with a TWC (PF/

Figure 7:
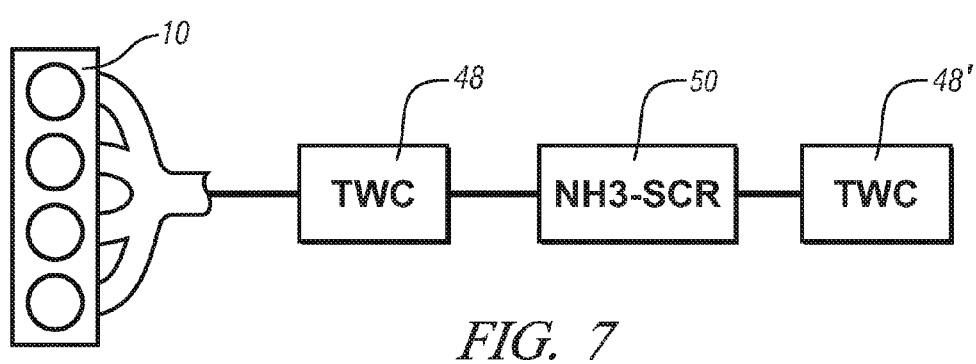
Figure 8:
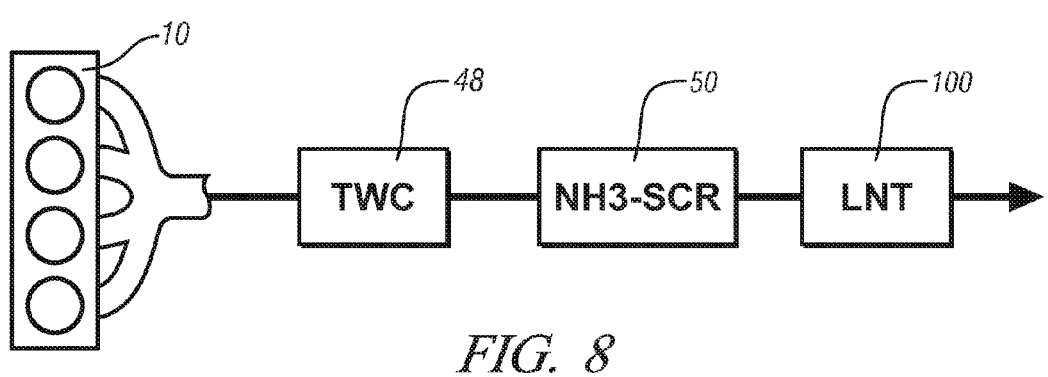
Figure 9:
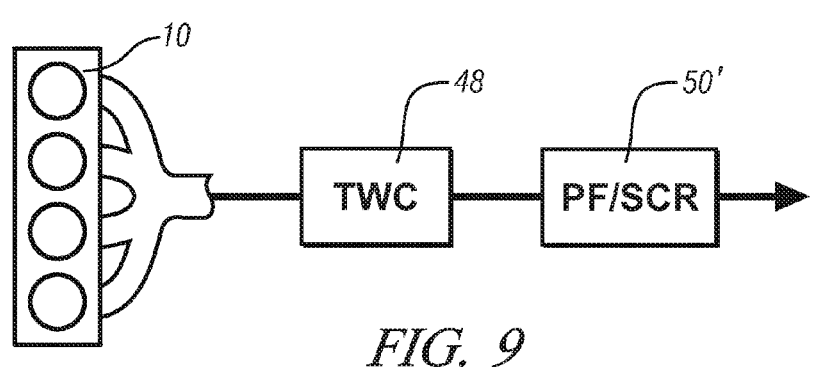

TWC) 48 upstream of the NH3-SCR device 50. FIG. 7 shows an engine 10 and an exhaust aftertreatment system including a first TWC 48 upstream of the NH3-SCR device 50 and a second TWC 48' downstream of the NH3-SCR device 50. The second TWC 48' downstream of the NH3-SCR device 50 may comprise an oxidation catalyst for managing NH3 breakthrough. FIG. 8 shows an engine 10 and an exhaust aftertreatment configuration including a TWC 48, a SCR device 50 (NH3-SCR) and a NOx adsorber device 100 (LNT) downstream of the NH3-SCR device 50. FIG. 9 shows an engine 10 and an exhaust aftertreatment configuration including a TWC 48, and a NH3-SCR device combined with a particulate filter 50'.

Figure 10:
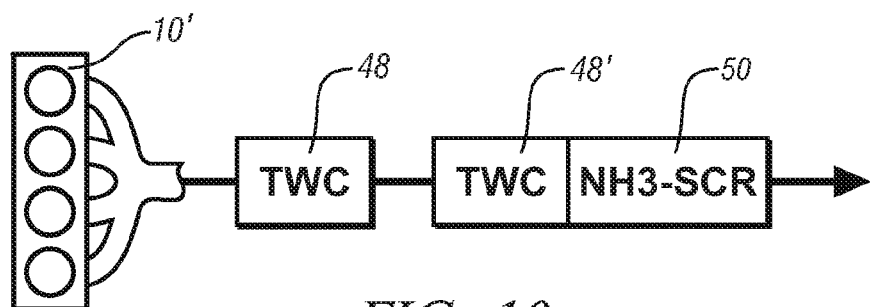

FIG. 10 shows another embodiment including an engine 10' and an exhaust aftertreatment configuration including a close-coupled TWC 48 and an underfloor converter including a second TWC 48' coupled to a NH3-SCR device 50. The engine 10' preferably comprises a port-fuel injection engine that injects fuel into runners of an intake manifold upstream of each combustion chamber (not shown). The engine 10' is controlled to operate at or about stoichiometry within a narrowly controlled band for $+/-\Delta AFR$ about stoichiometry which can be an air/fuel ratio band of 14.6:1+/−0.05 in one embodiment.

Figure 11:
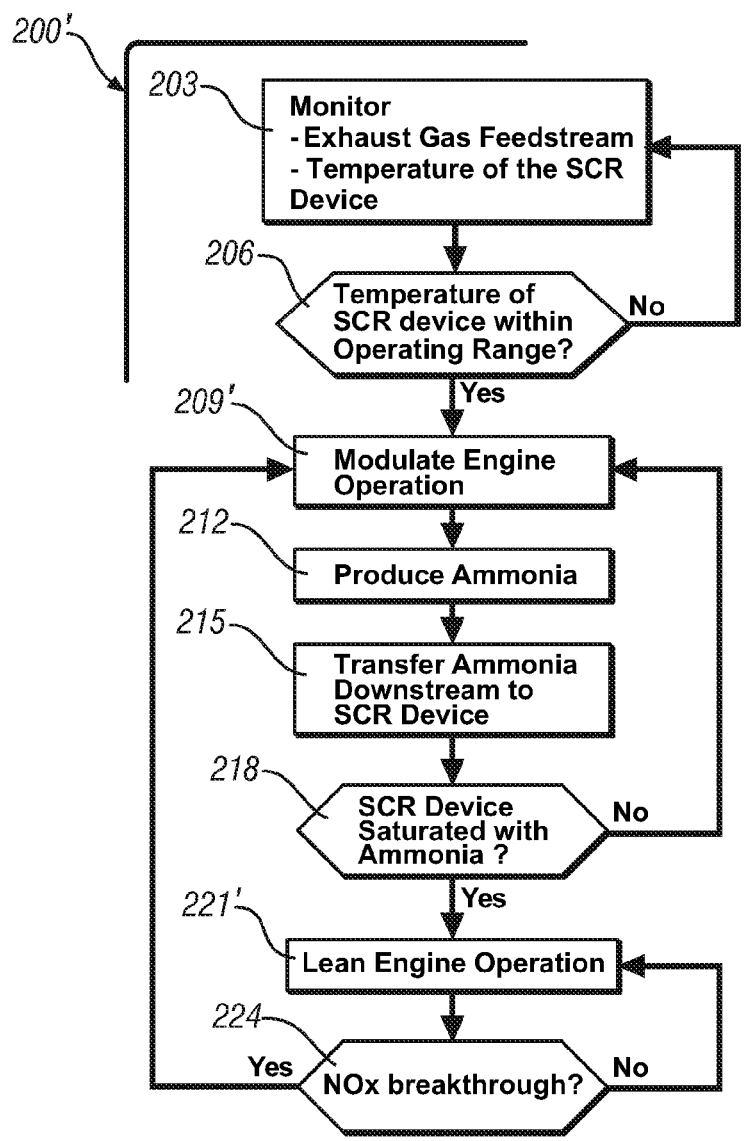
FIG. 11 is a control scheme for managing an exhaust gas feedstream from the engine in accordance with the present disclosure.

FIG. 11 shows a second control scheme 200' comprising a method for managing an exhaust gas feedstream from the embodiment described with reference to FIG. 10 comprising the port-fuel injection engine 10' and the aftertreatment system comprising the TWC 48 and the NH3-SCR device 50 during engine operations, with like elements identified using like numerals. Although not shown in detail, the embodiment described in FIG. 10 includes an engine-out exhaust gas sensor, a first NOx sensor upstream of the NH3-SCR device 50, a second NOx sensor downstream of the NH3-SCR device 50, and a temperature sensor configured to monitor temperature of the NH3-SCR device 50.

The control scheme 200' comprises monitoring the exhaust gas feedstream and the aftertreatment system (203). Monitoring the exhaust gas feedstream includes detecting NOx breakthrough and ammonia breakthrough downstream of the NH3-SCR device 50 using the second NOx sensor. Monitoring the aftertreatment system can include monitoring temperature of the NH3-SCR device 50 using the SCR temperature sensor. Before modulating engine operation to produce ammonia, the temperature of the NH3-SCR device 50 is preferably within a predetermined temperature range that corresponds to the specific catalytic material comprising a catalytically active base metal that is used in the NH3-SCR device 50 (206). In one embodiment the predetermined temperature range is 150° C. to 450° C. for the NH3-SCR device 50. Preferably, the temperature of the NH3-SCR device 50 is monitored continuously using the SCR temperature sensor. In this control scheme 200', engine operation is preferably at or near stoichiometry. When the temperature of the NH3-SCR device 50 is outside the predetermined temperature range, engine operation is controlled to prevent operation in a fuel cutoff mode, e.g., during decelerations, and prevent autonomic engine stops.

Figure 12:
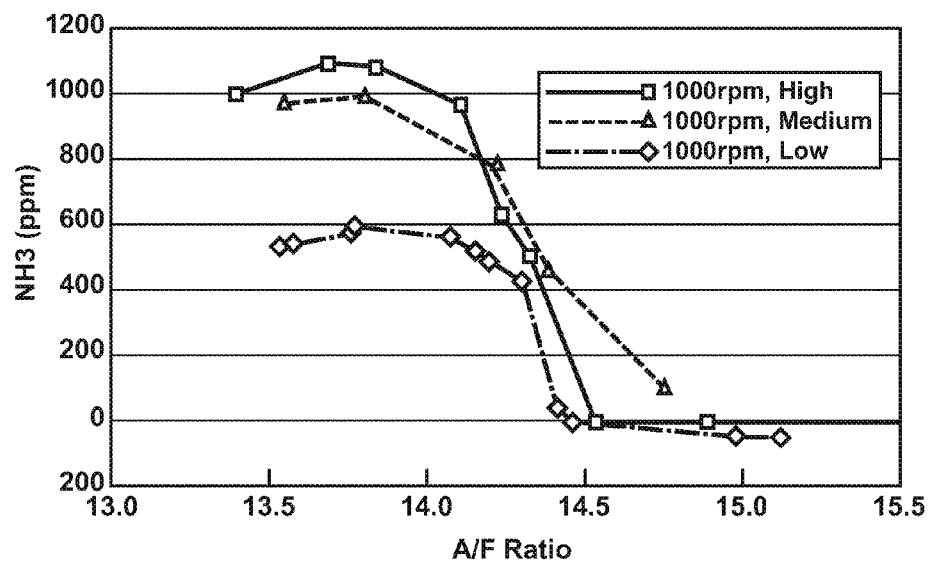
FIGS. 12-16 graphically depict exemplary test data in accordance with the present disclosure.

FIG. 12 shows ammonia production (NH3) corresponding to engine-out air/fuel ratio (A/F Ratio) in the exhaust gas feedstream downstream of a close-coupled three-way catalytic converter for an exemplary system at several engine loads (Low, Medium, High) at a predetermined engine operating speed (1000 rpm). The results indicate that ammonia production maximizes at an air/fuel ratio of about 14:1, and within an air/fuel ratio range between 13.5:1 and 14.5:1, thus indicating a preferred air/fuel ratio point for maximizing ammonia production. The results further indicate that there is some ammonia production during stoichiometric operation when the engine-out air/fuel ratio oscillates rich and lean of stoichiometry, including when the air/fuel ratio oscillates rich and lean of stoichiometry with an expanded band for $+/-\Delta AFR$ about stoichiometry.

When the temperature of the NH3-SCR device 50 is within the predetermined temperature range, the control scheme 200' modulates engine operation to produce the nitric oxide (NO), carbon monoxide (CO), and hydrogen ($H_2$) for ammonia production (209'). In this embodiment, modulating engine operation may include operating the engine 10' at stoichiometry, operating the engine 10' at stoichiometry with an expanded band for $+/-\Delta AFR$ about stoichiometry, e.g., 14.6: 1+/−0.2 in one embodiment, and operating the engine 10' at or about an air/fuel ratio of 14:1, depending upon an anticipated need for ammonia. The ammonia produced in the catalytic device 48 as described hereinabove using the nitric oxide (NO), carbon monoxide (CO), and hydrogen ($H_2$) (212), is transferred downstream to the NH3-SCR device 50 for storage (215) while monitoring the NH3-SCR device 50 for saturation (218). So long as the NH3-SCR device 50 does not saturate, the control scheme 200' may operate within this loop to manage the exhaust gas feedstream.

When the control scheme 200' determines the NH3-SCR device 50 is saturated with ammonia (218), engine operation can be adjusted to discontinue modulating engine operation to ammonia production (221'). This includes responding to commands for engine operating conditions that are not conducive to ammonia production, including fuel cutoff events, e.g., during deceleration events and engine stopping, and transitioning engine operation to lean engine operation. The control scheme 200' discontinues modulating engine operation to produce ammonia when the NH3-SCR 50 saturates, and transitions engine operation to lean engine operation resulting in increased NOx emissions into the exhaust gas feedstream. Lean engine operation can include operating at an air/fuel ratio of about 16.0:1. The stored ammonia is depleted as ammonia molecules react with NOx molecules. Although not shown explicitly, the engine 10' may be commanded to operate lean of stoichiometry in response to engine and vehicle operation, including fuel cutoff events, e.g., during deceleration events, engine idling, and engine stopping events, as can occur with engine stop/start systems associated with hybrid powertrain system operation. The control scheme 200' preferably discontinues lean engine operation after detecting NOx breakthrough downstream from the NH3-SCR device 50 (224). After determining that ammonia is depleted or detecting NOx breakthrough, the control scheme 200' may modulate engine operation to produce ammonia (209').

Figure 13:
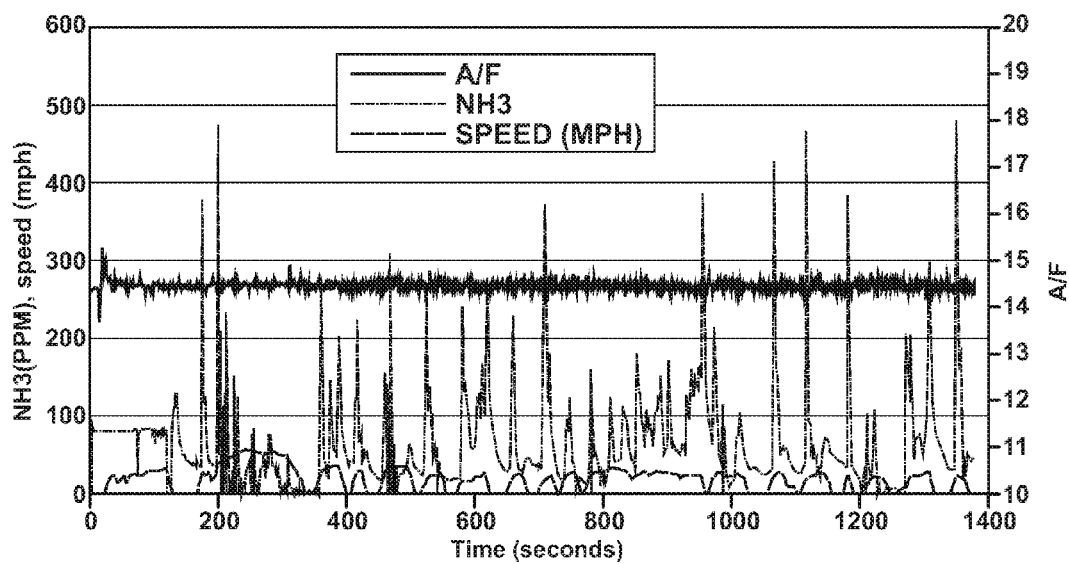

FIG. 13 graphically shows engine-out air/fuel ratio (A/F), vehicle speed (MPH), and ammonia generation (NH3) over a series of acceleration and deceleration events for an exemplary vehicle including an engine 10' and aftertreatment system configured as described with reference to FIG. 10, with the engine 10' operating at stoichiometry. The series of acceleration and deceleration events are analogous to an FTP-18 driving cycle. The results indicate a substantial amount of ammonia being produced during stoichiometric engine operation.

Figure 14:
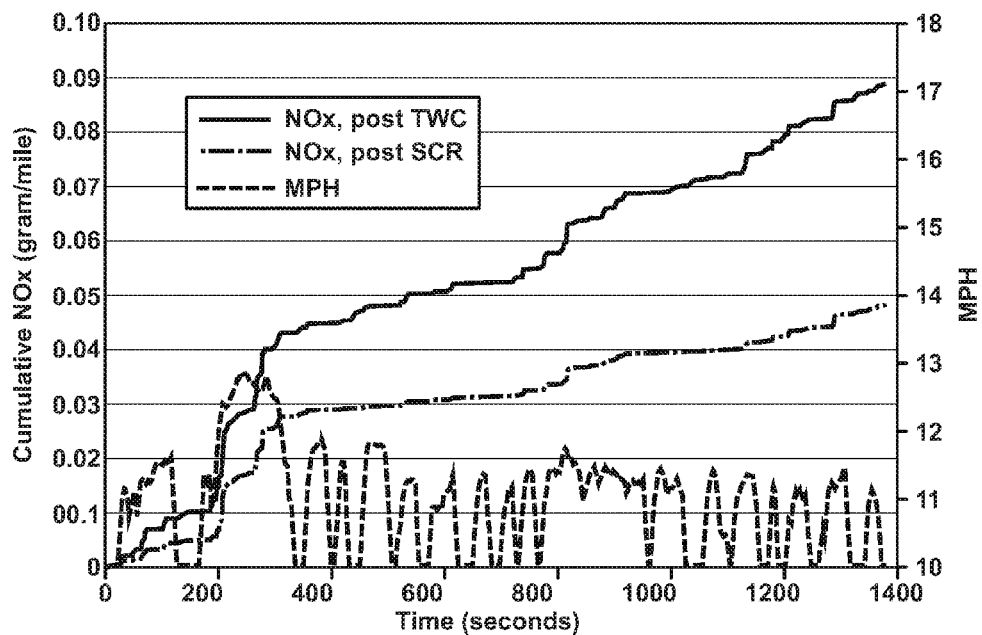

FIG. 14 graphically shows vehicle speed (MPH), and NOx emissions into and out of the NH3-SCR device 50 which comprises an Fe-SCR device over a series of acceleration and deceleration events for an exemplary vehicle including an exemplary engine 10 and aftertreatment system, with the engine 10 operating at stoichiometry. The series of acceleration and deceleration events are analogous to an FTP-18 driving cycle. The results indicate a reduction in NOx emissions across the NH3-SCR device in the presence of ammonia produced during stoichiometric engine operation.

Figure 15:
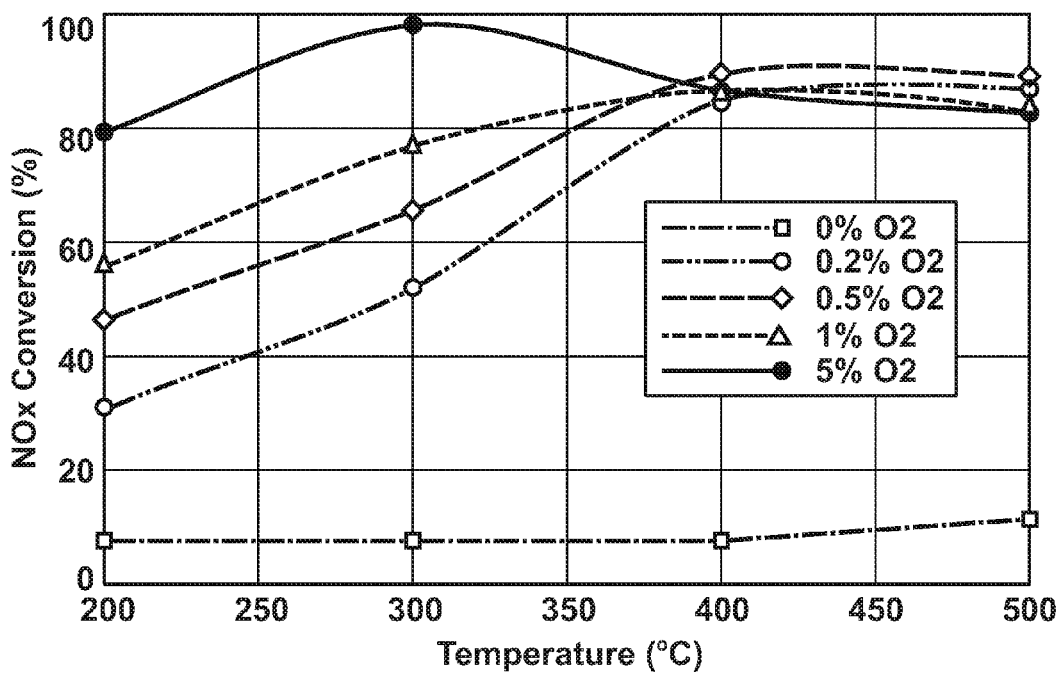
Figure 16:
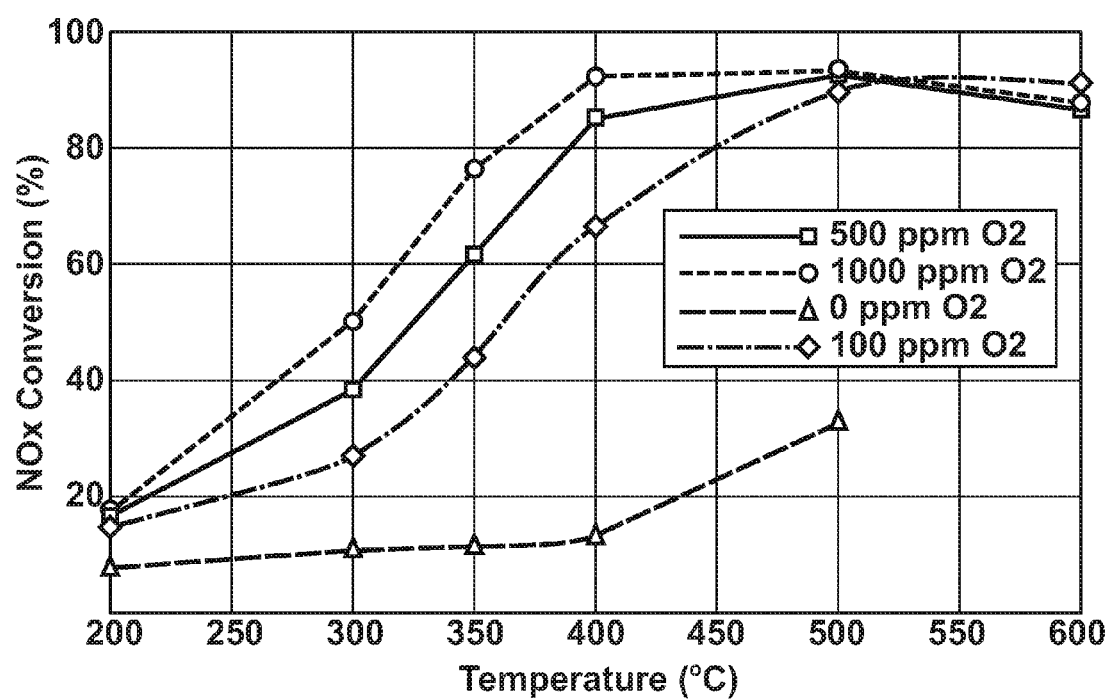

FIG. 15 graphically shows NOx conversion efficiency (%) corresponding to temperature across an NH3-SCR device using copper as the catalytic material. The results indicate that there is low conversion efficiency when there is no oxygen ($O_2$) present, but that with low levels of oxygen, e.g., 0.5% concentration in the feedstream, the conversion efficiency increased substantially, including conversion efficiency in excess of 80% at 0.5% oxygen concentration in the feedstream when the temperature was at or above 350° C. FIG. 16 graphically shows NOx conversion efficiency (%) corresponding to temperature across an NH3-SCR device using iron as the catalytic material. The results indicate that there is low conversion efficiency when there is no oxygen ($O_2$) present, but that with low levels of oxygen concentration in the feedstream, e.g., 0.05% or 500 ppm, the conversion efficiency increased substantially, including a conversion efficiency in excess of 60% at 0.05% oxygen concentration in the feedstream when the temperature was at or above 350° C. The results of FIGS. 15 and 16 indicate that there can be substantial NOx conversion at exhaust gas feedstream conditions having low levels of oxygen, e.g., as occurs at stoichiometric engine operation.

The method described herein contemplates production of ammonia through engine modulation, utilizing components of the exhaust gas feedstream to sustain aftertreatment of NOx in an SCR device. It will be appreciated that these methods can be used in isolation from urea injection, with the methods described supplying all of the required ammonia. Alternatively, the methods described herein can be used to complement a urea injection system, extending the range of the system between required filling of a urea storage tank while allowing a full range of engine and powertrain operation without significant monitoring of ammonia production cycles and ammonia storage capacity, due to available urea injection on demand.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for reducing NOx emissions in an exhaust gas feedstream output from an internal combustion engine, the method comprising:
    equipping the engine with an exhaust aftertreatment system including a catalytic device fluidly serially connected upstream of an ammonia-selective catalytic reduction device, the ammonia-selective catalytic reduction device including catalytic material comprising a base metal;
    monitoring a temperature of the ammonia-selective catalytic reduction device;
    forbidding operation of the engine at a lean of stoichiometry air/fuel ratio and a rich of stoichiometry air/fuel ratio when a temperature of the ammonia-selective catalytic reduction device is not within a predetermined operating range defined by a lower temperature limit and an upper temperature limit;
    only when the temperature of the ammonia-selective catalytic reduction device is within the predetermined operating range defined by the lower temperature limit and the upper temperature limit, modulating the engine to generate an engine-out exhaust gas feedstream including nitric oxide, carbon monoxide, and hydrogen that converts to ammonia on the catalytic device, wherein modulating the engine comprises operating the engine at one of a stoichiometric air/fuel ratio and a rich of stoichiometry air/fuel ratio;
    storing the ammonia on the ammonia-selective catalytic reduction device; and
    reducing NOx emissions in the exhaust gas feedstream in the ammonia-selective catalytic reduction device using the stored ammonia.

2. The method of claim 1, wherein the catalytic device comprises a three-way catalytic device fluidly serially connected upstream of the ammonia-selective catalytic reduction device, and wherein the base metal comprises one of iron, copper, vanadium, tungsten, and titanium.

3. The method of claim 1, wherein modulating the engine comprises operating the engine at the stoichiometric air/fuel ratio to generate the engine-out exhaust gas feedstream comprising nitric oxide, carbon monoxide, and hydrogen in the exhaust gas feedstream.

4. The method of claim 1, wherein modulating the engine comprises operating the engine within an air/fuel ratio range between 13.5:1 and 14.5:1 to generate the engine-out exhaust gas feedstream comprising nitric oxide, carbon monoxide, and hydrogen in the exhaust gas feedstream.

5. The method of claim 1, further comprising operating the engine lean of stoichiometry subsequent to storing ammonia on the ammonia-selective catalytic reduction device.

6. The method of claim 5, further comprising:
    equipping the aftertreatment system with a NOx sensor configured to monitor the exhaust gas feedstream downstream from the ammonia-selective catalytic reduction device;
    monitoring a signal output from the NOx sensor; and
    discontinuing operating the engine lean of stoichiometry when the signal output from the NOx sensor indicates NOx breakthrough downstream from the ammonia-selective catalytic reduction device.

7. The method of claim 1, wherein modulating the engine to generate the engine-out exhaust gas feedstream including nitric oxide, carbon monoxide, and hydrogen is effected when the ammonia-selective catalytic reduction device is ammonia depleted.

8. The method of claim 7, wherein modulating the engine further comprises:
    injecting a first fuel pulse into a combustion chamber of the engine during each combustion cycle sufficient to power to engine responsive to an operator torque request; and
    injecting a second fuel pulse into the combustion chamber during a subsequent stroke of the combustion cycle.

9. The method of claim 7, further comprising discontinuing modulating the engine to generate nitric oxide, carbon monoxide, and hydrogen in the exhaust gas feedstream when the ammonia-selective catalytic reduction device has stored a predetermined amount of ammonia.

10. The method of claim 9, further comprising:
    equipping the aftertreatment system with a NOx sensor configured to monitor the exhaust gas feedstream downstream from the ammonia-selective catalytic reduction device; and
    monitoring a signal output from the NOx sensor to monitor the ammonia-selective catalytic reduction device for ammonia saturation and depletion.

11. The method of claim 9, further comprising operating the engine lean of stoichiometry subsequent to storing ammonia on the ammonia-selective catalytic reduction device.

12. A method for reducing NOx emissions in an exhaust gas feedstream from a spark-ignition, direct-injection internal combustion engine operative lean of stoichiometry, the method comprising:
   equipping the engine with an aftertreatment system including a three-way catalytic converter fluidly connected upstream of an ammonia-selective catalytic reduction device, the aftertreatment system including a sensor configured to monitor the exhaust gas feedstream downstream from the ammonia-selective catalytic reduction device;
   forbidding operation of the engine at a lean of stoichiometry air/fuel ratio and a rich of stoichiometry air/fuel ratio when a temperature of the ammonia-selective catalytic reduction device is not within a predetermined operating range defined by a lower temperature limit and an upper temperature limit;
   only when the temperature of the ammonia-selective catalytic reduction device is within the predetermined operating range, operating the engine to generate an exhaust gas feedstream including nitric oxide, carbon monoxide, and hydrogen that converts to ammonia on the three-way catalytic converter, wherein operating the engine comprises operating the engine at one of a stoichiometric air/fuel ratio and a rich of stoichiometry air/fuel ratio;
   storing the ammonia on the ammonia-selective catalytic reduction device;
   operating the engine lean of stoichiometry; and
   reducing NOx emissions in the ammonia-selective catalytic reduction device using the stored ammonia.

13. The method of claim 12, further comprising:
   monitoring signal output of the sensor configured to monitor the exhaust gas feedstream downstream from the ammonia-selective catalytic reduction device;
   wherein operating the engine lean of stoichiometry is initiated when the signal output of the sensor indicates the ammonia-selective catalytic reduction device is ammonia saturated; and
   wherein operating the engine lean of stoichiometry is discontinued when the signal output from the sensor indicates NOx breakthrough downstream from the ammonia-selective catalytic reduction device.

14. An exhaust aftertreatment system for an internal combustion engine including a port fuel injection system, comprising:
   a plurality of exhaust gas treatment devices consisting of
      a three-way catalytic converter device formulated to produce ammonia from an exhaust gas feedstream including nitric oxide, carbon monoxide, and hydrogen, the three-way catalytic converter device close-coupled to an exhaust manifold of the internal combustion engine and fluidly coupled to an ammonia-selective catalytic reduction device located downstream of the three-way catalytic converter device, and
      the ammonia-selective catalytic reduction device including catalytic material comprising a single base metal comprising one of iron, copper, vanadium, tungsten, and titanium;
   a temperature sensor configured to monitor temperature of the ammonia-selective catalytic reduction device; and
   an electronic control module including programming comprising:
      forbidding operation of the engine at a lean of stoichiometry air/fuel ratio and a rich of stoichiometry air/fuel ratio when a temperature of the ammonia-selective catalytic reduction device is not within a predetermined operating range defined by a lower temperature limit and an upper temperature limit;
      only when the temperature of the ammonia-selective catalytic reduction device is within the predetermined operating range defined by the lower temperature limit and the upper temperature limit, modulating the engine to generate an engine-out exhaust gas feedstream including nitric oxide, carbon monoxide, and hydrogen that converts to ammonia on the three-way catalytic converter device, wherein modulating the engine comprises operating the engine at one of a stoichiometric air/fuel ratio and a rich of stoichiometry air/fuel ratio,
      storing the ammonia on the ammonia-selective catalytic reduction device, and
      reducing NOx emissions in the exhaust gas feedstream in the ammonia-selective catalytic reduction device using the stored ammonia.

15. An exhaust aftertreatment system for an internal combustion engine, comprising:
   a catalytic converter device formulated to produce ammonia from an exhaust gas feedstream including nitric oxide, carbon monoxide, and hydrogen, the catalytic converter device close-coupled to an exhaust manifold of the internal combustion engine and fluidly coupled to an ammonia-selective catalytic reduction device located downstream of the catalytic converter device;
   the ammonia-selective catalytic reduction device including catalytic material comprising a single base metal;
   a NOx sensor configured to monitor NOx molecules in the exhaust gas feedstream downstream of the ammonia-selective catalytic reduction device;
   a temperature sensor configured to monitor temperature of the ammonia-selective catalytic reduction device; and
   an electronic control module including programming comprising:
      forbidding operation of the engine at a lean of stoichiometry air/fuel ratio and a rich of stoichiometry air/fuel ratio when a temperature of the ammonia-selective catalytic reduction device is not within a predetermined operating range defined by a lower temperature limit and an upper temperature limit;
      only when the temperature of the ammonia-selective catalytic reduction device is within the predetermined operating range, modulating the engine to generate an engine-out exhaust gas feedstream including nitric oxide, carbon monoxide, and hydrogen that converts to ammonia on the catalytic converter device, wherein modulating the engine comprises operating the engine at one of a stoichiometric air/fuel ratio and a rich of stoichiometry air/fuel ratio,
      storing the ammonia on the ammonia-selective catalytic reduction device, and
      reducing NOx emissions in the exhaust gas feedstream in the ammonia-selective catalytic reduction device using the stored ammonia.

16. The exhaust aftertreatment system of claim 15, further comprising a particulate filter combined with the close-coupled catalytic converter device.

17. The exhaust aftertreatment system of claim 15, further comprising a three-way catalytic converter device fluidly connected downstream of the ammonia-selective catalytic reduction device.

18. The exhaust aftertreatment system of claim 15, further comprising a NOx adsorber device fluidly connected downstream of the ammonia-selective catalytic reduction device.

19. The exhaust aftertreatment system of claim 15, further comprising a particulate filter combined with the ammonia-selective catalytic reduction device including the catalytic material comprising the single base metal.

20. The exhaust aftertreatment system of claim 15, wherein the catalytic converter device comprises an oxidation catalyst.

21. The exhaust aftertreatment system of claim 15, wherein the catalytic converter device comprises a three-way catalytic device.

* * * * *